Aug. 17, 1954    E. B. TOLMAN, JR., ET AL    2,686,617
METHOD OF AND APPARATUS FOR DISCHARGING
PULVERULENT MATERIAL FROM BINS
Filed Oct. 19, 1950    2 Sheets-Sheet 1
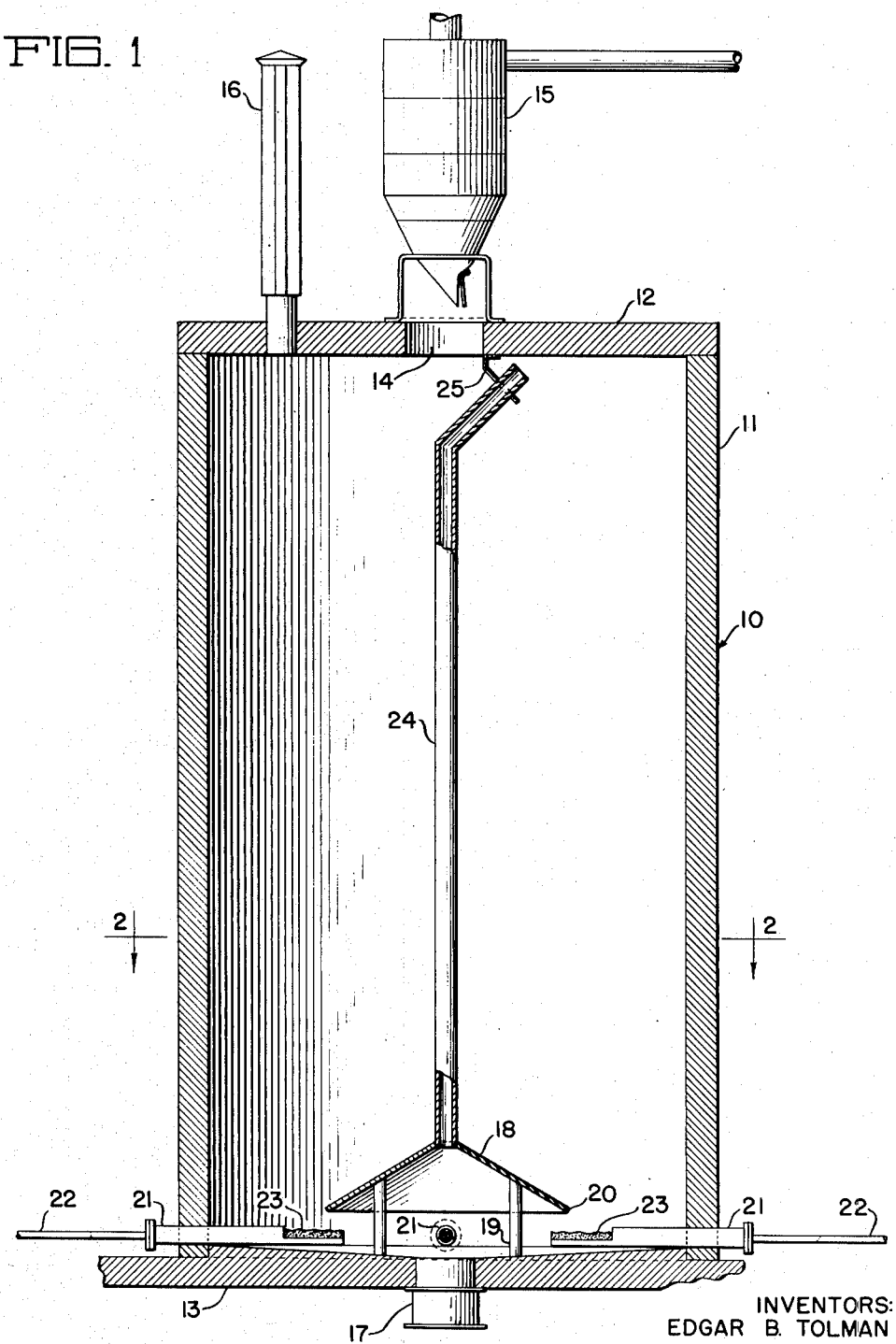
INVENTORS:
EDGAR B. TOLMAN JR.
RAY W. WILLIAMS
BY: Schroeder, Merriam,
Hofgren & Brady
ATTORNEYS.

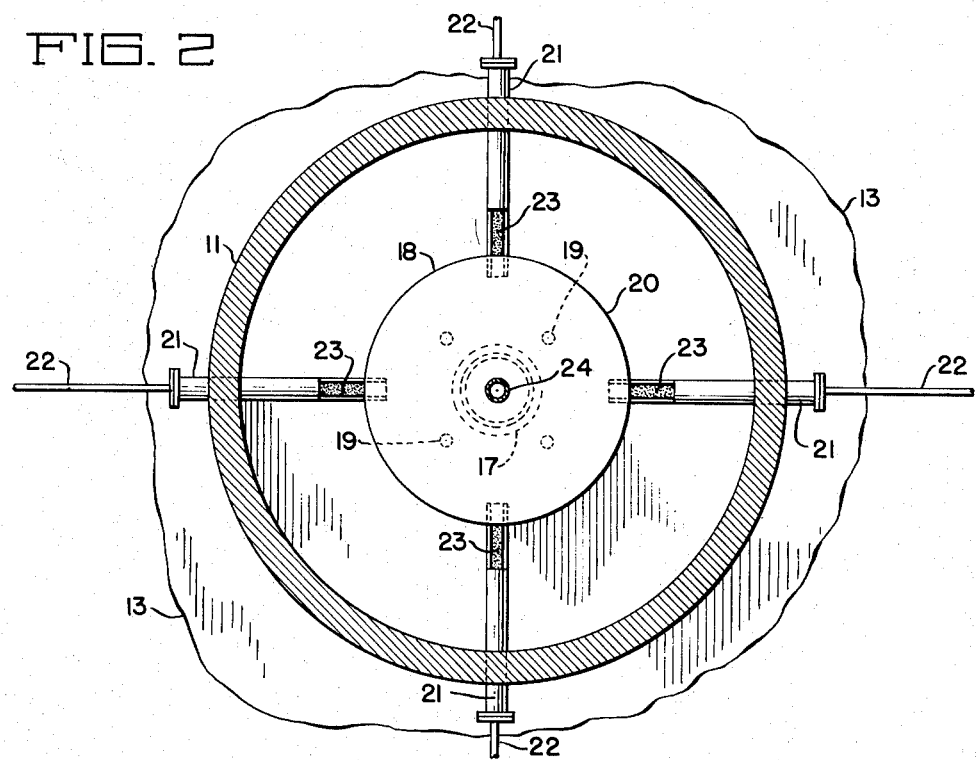
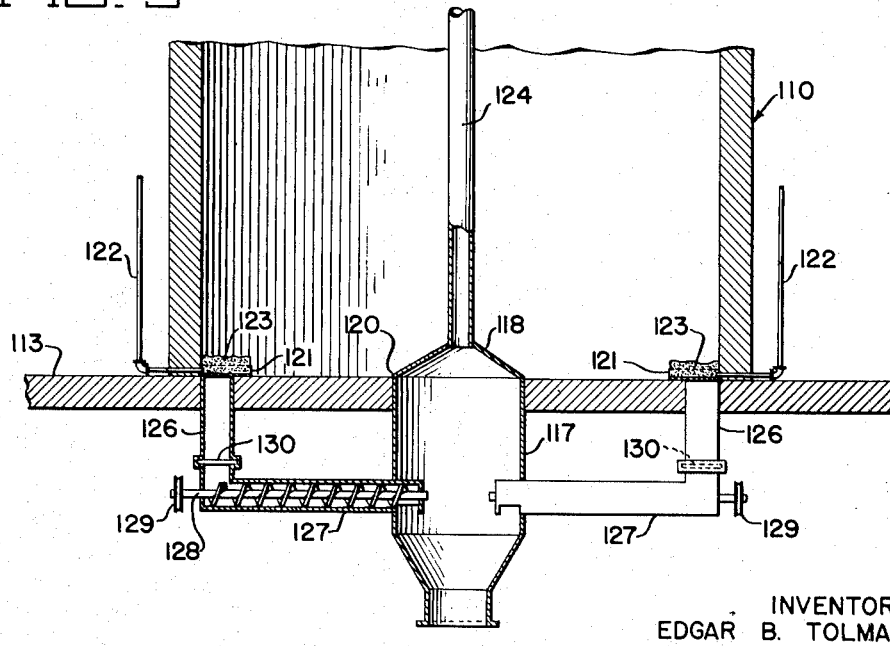

Patented Aug. 17, 1954

2,686,617

UNITED STATES PATENT OFFICE 2,686,617

METHOD OF AND APPARATUS FOR DISCHARGING PULVERULENT MATERIAL FROM BINS

Edgar B. Tolman, Jr., Chicago, and Ray W. Williams, Blue Island, Ill., assignors to United Conveyor Corporation, a corporation of Illinois Application October 19, 1950, Serial No. 191,005

5 Claims. (Cl. 222—195)

1

This invention relates to a method of and apparatus for discharging dry pulverulent material, such as fine ash, from a storage bin.

Fine pulverulent material, such as "fly" ash is extremely difficult to discharge by gravity from a storage bin of any substantial size. The material becomes compacted in the bin due to its weight, and this leaves it in a condition where it arches above the discharge opening after a certain amount of the material is dropped out. Considerable aeration is required in order to break up the arched material, and when the arch is broken a large quantity of ash is likely to fall into the discharge opening, so that discharge of the material from the bin proceeds very irregularly.

Furthermore, the ash ordinarily discharges only from a cylindrical space directly above the discharge opening, and may form a hole extending to the top of the ash in the bin. When this cylindrical opening has reached the top the material slumps off irregularly and falls to the outlet at high speed. The continuation of this action produces intermittent heavy avalanching, and the fine material frequently traps air in the discharge conduit, giving a mixture of air and ash at high pressure, making it substantially impossible to control the discharge of the material from the bin.

The present invention prevents arching of material above the discharge opening, and thus prevents avalanching of material directly into the discharge opening, or conduit; and provides for aerating, or fluidizing the ash at a plurality of places adjacent the bottom of the bin so that it may flow, or may be conveyed, transversely into a discharge conduit for gravity discharge. Aerated, or fluidized ash has a very low angle of repose, so that it will flow like water on even a very slightly inclined surface.

A baffle is placed above the discharge opening to prevent entry of material into the opening from the area directly above it, so that arching cannot take place above the opening. A plurality of fluidizers are disposed about the circumference of the bin, so that if temporary arching takes place above any particular fluidizer, the flow from the remaining fluidizers will be sufficient to maintain a reasonably steady supply of material to the discharge conduit. Thus,

2 stated broadly, the invention consists in aerating parts of the material adjacent the bottom of a storage bin to render such parts flowable and moving the flowable part of the material toward a discharge conduit while preventing direct gravity feed of material from the bin to the conduit.

The fluidizers above referred to are well-known devices in the handling of very fine pulverulent material, and consist of discharge members for high pressure air which have a porous surface so that the air flows from the discharge members, or aerators into the surrounding material over a broad area which is unbroken by any local air streams such as would be produced by a foraminous discharge member. As used herein the terms "aerate," "aerator" and "aeration" are limited to the fluidizing type of aeration here described, as distinct from any jet stream action such as is produced in movement of material by discrete air streams from nozzles. This high pressure air moves with the ash to the discharge opening, or conduit, and in order to avoid excessive air pressures within the conduit, the air is preferably vented from the space below the baffle to the atmosphere outside the bin. Venting in the foregoing manner prevents damage to the conduit and to ash moving equipment or valves which are fed by the conduit.

The invention is illustrated in a preferred and an alternative embodiment in the accompanying drawings, in which:

Fig. 1 is a central, vertical section of an ash storage bin provided with discharge means embodying the preferred form of the invention; Fig. 2 is a section taken as indicated along the line 2—2 of Fig. 1; and Fig. 3 is a fragmentary central vertical section of a storage bin provided with an alternative embodiment of the invention.

Referring to the drawings in greater detail and referring particularly to Fig. 1 a storage bin, indicated generally at 10, has an upright cylindrical side wall 11, a top 12 and a bottom 13. The top has an inlet opening 14 through which a hopper feed 15 may discharge ash to the bin, and a stack 16 is provided to vent air from the interior of the bin.

The bottom 13 slopes toward a central ash discharge conduit 17 through which ash may pass directly to cars, or to any desired arrangement of ash conveyors. It is necessary to provide means to prevent direct gravity feed of material from the bin to the discharge conduit 17 from the space directly thereabove, and to this end an inverted conical baffle 18 is supported on a plurality of legs 19 so that its outer margin 20 is spaced above the bottom 13 of the bin. A plurality of aerators 21 extend through the wall 11 of the bin, and project slightly beneath the outer margin 20 of the baffle 18. The aerators, or fluidizers 21 are connected by pipes 22 to a source of high pressure air (not shown) and have porous portions 23 through which the air may pass in order to fluidize that part of the ash surrounding each aerator; the aeration of ash to fluidize it being well known in the art. For convenience in servicing the bin discharge equipment, each fluidizer 21 may be withdrawn from the wall 11 for repair or replacement without emptying the bin.

An air venting pipe 24 extends from the underside of the baffle 18 to the top of the bin, and is supported on a bracket 25. Thus the high pressure air from the fluidizers may be vented from beneath the baffle 18 to the portion of the bin above the top of the ash, and thence through the stack 16 to the atmosphere.

In operation, ash stored in the bin is prevented by the baffle 18 from discharging directly into the conduit 17. Hence, arching of ash above the conduit opening is prevented, and avalanching is avoided. When air is admitted from the pipes 22 to the aerators 21, the ash adjacent each aerator is made flowable so that it can travel along the sloping bottom 13 of the bin by gravity and discharge through the conduit 17. Fluidizing the ash minimizes the possibility of arching and avalanching of ash outside the baffle 18, and provision of several fluidizers 21 practically assures a smooth, steady flow of ash to the conduit 17. The vent pipe 24 removes the high pressure air from beneath the baffle 18 and thus prevents ash from being driven into the discharge conduit opening under pressure, thereby minimizing wear of the discharge conduit, and of valves or conventional ash handling elements receiving ash from it.

In the modified form illustrated in Fig. 3, a bin 110 has an upright cylindrical side wall 111 and a flat bottom 113. A discharge conduit 117 projects through the bottom 113 of the bin, and has its upper end sealed to the margin 120 of an inverted conical baffle 118 which prevents ash from the bin from entering the conduit 117 from directly above.

About the periphery of the bin 110 are a plurality of aerators 121 which are connected by pipes 122 to a source of high pressure air (not shown); and each aerator, or fluidizer 121 has a porous portion 123. Conveniently there may be eight fluidizers 121, arranged in closely spaced pairs with an ash discharge pipe 126 extending downwardly through the floor 113 of the bin between each such pair. Each discharge pipe 126 communicates with an ash conveyor pipe 127 which has a discharging end projecting into the discharge conduit 117. Each conveyor pipe 127 is provided with some conventional ash moving device such, for example, as the screw conveyor 128 which may be driven from any suitable power source (not shown) acting through the pulley 129 but any known ash moving means may be employed. Preferably each ash discharge pipe 126 is provided with an emergency gate valve 130 by which flow of ash to the conveyor pipe 127 may be stopped; although ordinarily the flow may be adequately controlled by controlling the supply of air to the aerators 121.

An air vent pipe 124 extends from beneath the baffle 118 to the upper part of the bin 110, above the top of the ash.

From the above description it is plain that the operation of the alternative form of the invention is broadly like that of the preferred form, in that the baffle 118 prevents direct flow of ash to the discharge conduit 117 from above, while the aerators 121 feed ash to the conduit from a plurality of places at the bottom of the bin. Again, the vent pipe 124 prevents high pressure air from passing out of the bin through the lower, or feeding end of the discharge conduit 117. In this form, the relatively large conduit 117 serves as an auxiliary storage bin, thus providing for a steady flow of material to cars or to any ash conveying equipment fed from the bin.

The foregoing detailed description is given for clearness of understanding only and no unnecessary limitations should be understood therefrom, as variations will be apparent to those skilled in the art.

We claim:

1. Discharge apparatus for a storage bin for pulverulent material, comprising: discharge means at the bottom of the bin; an aerating element positioned substantially on the bottom of the bin to establish a thin layer of aerated material at the bottom of the bin, said aerated material having its angle of repose reduced to render it fluid so that it may flow transversely toward and into said discharge means; and fixed baffle means positioned in the bin above the discharge means and above the level of said aerating element to prevent gravity feed of unaerated material from the bin into the discharge means while permitting said layer of aerated material to flow beneath the baffle means and into the discharge means.

2. The apparatus of claim 1 in which the baffle means is a conical plate of small slope which is substantially wider than the upper margin of the discharge means, and the aerating element projects beneath the periphery of the baffle.

3. Discharge apparatus for a storage bin for pulverulent material, comprising: discharge means at the bottom of the bin; an aerating element at the bottom of the bin to aerate part of the material so as to reduce its angle of repose; a floor in said bin which is pitched substantially uniformly toward said discharge means, said floor being disposed at an angle from the horizontal which is less than the angle of repose of unaerated material and greater than that of aerated material; and baffle means positioned over said discharge means above the level of said aerating element to prevent unaerated material in the bin from entering said discharge means while permitting aerated material to flow beneath the baffle and into the discharge means.

4. The apparatus of claim 3 in which the discharge means is centrally located and is surrounded by a plurality of aerating elements, and the baffle means is a plate of substantial width which extends over the inner ends of the aerating elements.

5. Discharge apparatus for a storage bin for pulverulent material, comprising: discharge means at the bottom of the bin; an aerating element at the bottom of the bin to aerate part of the material so as to reduce its angle of repose and permit it to flow transversely toward and into said discharge means; fixed baffle means positioned in the bin above the discharge means to prevent gravity feed of unaerated material from the bin into the discharge means while permitting aerated material to flow beneath the baffle and into the discharge means; and a vent extending from the space below the baffle to the atmosphere.

References Cited in the file of this patent

UNITED STATES PATENTS

| Number | Name | Date |
|---|---|---|
| 1,971,852 | Goebels | Aug. 28, 1934 |
| 2,011,133 | Yoss | Aug. 13, 1935 |
| 2,316,814 | Schemm | Apr. 20, 1943 |
| 2,331,208 | Ludi | Oct. 5, 1943 |
| 2,527,488 | Schemm | Oct. 24, 1950 |
| 2,580,215 | Bozich | Dec. 25, 1951 |

FOREIGN PATENTS

| Number | Country | Date |
|---|---|---|
| 653,921 | Germany | Dec. 6, 1937 |
| 64,020 | Denmark | Oct. 8, 1945 |